United States Patent
Jiang et al.

(10) Patent No.: US 11,823,457 B2
(45) Date of Patent: Nov. 21, 2023

(54) IMAGE RECOGNITION METHOD AND APPARATUS, BASED ON CONTEXT REPRESENTATION, AND COMPUTER-READABLE STORAGE MEDIUM

(71) Applicant: CONTEMPORARY AMPEREX TECHNOLOGY CO., LIMITED, Fujian (CN)

(72) Inventors: Guannan Jiang, Fujian (CN); Qiangwei Huang, Fujian (CN); Annan Shu, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/131,379

(22) Filed: Apr. 6, 2023

(65) Prior Publication Data
US 2023/0245457 A1 Aug. 3, 2023

Related U.S. Application Data

(63) Continuation of application No. PCT/CN2021/132513, filed on Nov. 23, 2021.

(51) Int. Cl.
*G06V 20/50* (2022.01)
*G06V 10/82* (2022.01)
(Continued)

(52) U.S. Cl.
CPC .............. *G06V 20/50* (2022.01); *G06V 10/26* (2022.01); *G06V 10/44* (2022.01); *G06V 10/768* (2022.01); *G06V 10/82* (2022.01)

(58) Field of Classification Search
CPC ........ G06V 20/50; G06V 10/26; G06V 10/44; G06V 10/768; G06V 10/82
See application file for complete search history.

(56) References Cited

U.S. PATENT DOCUMENTS

| | | | | |
|---|---|---|---|---|
| 2010/0259546 A1* | 10/2010 | Yomdin | ................ | G06T 7/12 |
| | | | | 345/473 |
| 2016/0267806 A1* | 9/2016 | Hsu | ................ | G09B 19/24 |

(Continued)

FOREIGN PATENT DOCUMENTS

| CN | 1924896 A | 3/2007 |
|---|---|---|
| CN | 12508032 A | 3/2021 |

(Continued)

OTHER PUBLICATIONS

International Search Report and Written Opinion dated Aug. 4, 2022, received for PCT Application PCT/CN2021/132513, filed on Nov. 23, 2021, 17 pages including English Translation.

(Continued)

*Primary Examiner* — Ming Y Hon
(74) *Attorney, Agent, or Firm* — XSENSUS LLP

(57) ABSTRACT

An image recognition method may include: acquiring a target image, where the target image may include a weld bead region; performing initial segmentation on the target image, to obtain a first recognition result, where the first recognition result may include first recognition information for the weld bead region in the target image; performing feature extraction on the target image, to obtain a region representation; obtaining a context representation based on the first recognition result and the region representation, where the context representation may be used for representing a correlation between each pixel and remaining pixels in the target image; and obtaining a second recognition result based on the context representation, where the second rec- (Continued)

ognition result may include second recognition information for the weld bead region in the target image.

11 Claims, 6 Drawing Sheets

(51) Int. Cl.
  *G06V 10/44*   (2022.01)
  *G06V 10/26*   (2022.01)
  *G06V 10/70*   (2022.01)

(56) References Cited

U.S. PATENT DOCUMENTS

| | | | |
|---|---|---|---|
| 2020/0357112 A1* | 11/2020 | Sakai | G06T 7/75 |
| 2021/0166347 A1* | 6/2021 | Arani | G06V 10/764 |
| 2022/0108170 A1* | 4/2022 | Shiomi | G06V 20/46 |
| 2022/0230420 A1* | 7/2022 | Cheng | G06V 10/7715 |
| 2022/0277167 A1* | 9/2022 | Velaga | G16H 10/20 |
| 2022/0415020 A1* | 12/2022 | Kashanipour | B23K 31/125 |
| 2023/0053154 A1* | 2/2023 | Mianzo | G06V 10/25 |

FOREIGN PATENT DOCUMENTS

| | | |
|---|---|---|
| CN | 113421304 A | 9/2021 |
| CN | 113486894 A | 10/2021 |
| JP | 2013-213733 A | 10/2013 |
| JP | 2014-014856 A | 1/2014 |

OTHER PUBLICATIONS

Zhang et al., "ACFNet: Attentional Class Feature Network for Semantic Segmentation", 2019 IEEE/CVF International Conference on Computer Vision (ICCV), informaarXiv: 1909.09408v3 [cs.CV], Oct. 18, 2019, 10 pages.

* cited by examiner

IMAGE RECOGNITION METHOD AND APPARATUS, BASED ON CONTEXT REPRESENTATION, AND COMPUTER-READABLE STORAGE MEDIUM

CROSS-REFERENCE TO RELATED APPLICATION

The present application is a continuation of International Application No. PCT/CN2021/132513, filed Nov. 23, 2021, which is incorporated herein by reference in its entirety.

TECHNICAL FIELD

The embodiments of the present application relate to the technical field of image processing, and in particular, to an image recognition method and apparatus, and a computer-readable storage medium.

BACKGROUND ART

During manufacturing of batteries, after filling of electrolyte into a battery, it is necessary to seal a filling port to prevent the electrolyte from overflowing. Generally, a sealing pin is used for sealing. After being inserted into the filling port, the sealing pin is welded on the battery. Therefore, the welding of the sealing pin is an indispensable link during the production of the battery, and whether the welding of the sealing pin meets the standard directly affects the safety performance of the battery.

The welding region of the sealing pin is referred to as a weld bead. Due to variations in temperature and other environmental factors during welding, there are often defects, such as pinholes, burst points, burst lines (also referred to as false welding), lack of welding, and melt beads, on the weld bead. During defect detection, weld bead positioning is required first, the accuracy of which will affect the accuracy of defect detection. Therefore, how to improve the accuracy of weld bead positioning is a technical problem to be solved.

SUMMARY OF THE DISCLOSURE

In view of the above problems, embodiments of the present application provide an image recognition method and apparatus, and a computer-readable storage medium, which can improve the accuracy of image recognition.

According to a first aspect of the embodiments of the present application, an image recognition method is provided, including: acquiring a target image, where the target image includes a weld bead region; performing initial segmentation on the target image, to obtain a first recognition result, where the first recognition result includes first recognition information for the weld bead region in the target image; performing feature extraction on the target image, to obtain a region representation; obtaining a context representation based on the first recognition result and the region representation, where the context representation is used for representing a correlation between each pixel and remaining pixels in the target image; and obtaining a second recognition result based on the context representation, where the second recognition result includes second recognition information for the weld bead region in the target image.

By means of coarse-to-fine segmentation, first of all, first recognition is performed on the target image, and the features in the target image are enhanced by using a result of the first recognition, to obtain the context representation for representing the correlation between each pixel and remaining pixels in the target image; and then, second recognition is performed on the context representation. As such, a more accurate recognition result can be obtained due to contextual information being fully used. The method of the embodiments of the present application can improve the safety of the battery when applied to the recognition of the sealing pin weld bead of the battery.

In some embodiments, the performing feature extraction on the target image, to obtain a region representation includes: performing feature extraction on the target image, to obtain a category representation matrix; and multiplying a matrix for representing the first recognition result by the category representation matrix, to obtain a region representation matrix for representing the region representation.

Since a category representation includes feature information of different regions, and the first recognition result also includes feature information of different regions, the accuracy of a finally obtained region representation is improved by comprehensively utilizing the region feature information included in the category representation and the first recognition result.

In some embodiments, the obtaining a context representation based on the first recognition result and the region representation includes: multiplying the matrix for representing the first recognition result by the region representation matrix for representing the region representation, to obtain a pixel correlation matrix, where the pixel correlation matrix is used for representing a correlation between each pixel in the target image and other pixels in a region to which the pixel belongs; and multiplying the pixel correlation matrix by the region representation matrix, to obtain a context representation matrix for representing the context representation.

The context representation matrix obtained based on the pixel correlation matrix and the region representation matrix integrates the correlation between each pixel in the target image and other pixels in the region to which the pixel belongs, and presents an automatic context-aware capability. The second recognition of the weld bead region based on the context representation matrix allows the accuracy of recognition to be further improved.

In some embodiments, the obtaining a second recognition result based on the context representation includes: performing a convolution operation on the context representation matrix for representing the context representation, to obtain the second recognition result.

The convolution operation is used to maintain the data structure of the original image, instead of unfolding the image into a vector and thus resulting in loss of spatial information. Neurons in a convolutional layer are connected to only a small region in the previous layer through a convolution kernel, rather than being fully connected thereto, which can reduce training parameters, thus improving efficiency.

In some embodiments, the method further includes: extracting contour points of the weld bead region from the second recognition result; and performing parameter fitting on the contour points, to obtain a third recognition result, where the third recognition result includes third recognition information for the weld bead region in the target image.

The parameter fitting of the extracted contour points enables the smoothing of the weld bead contour, and the third recognition result is thus obtained, such that the smoothness of the weld bead region during recognition is improved.

In some embodiments, the weld bead region includes a first contour line and a second contour line, and the first contour line and the second contour line enclose to form the weld bead region; and the performing parameter fitting on the contour points, to obtain a third recognition result includes: selecting N contour points from the contour points and adding same to a set of contour points, where N>1; performing parameter fitting on the set of contour points, to obtain a fitted model, matching remaining contour points, other than those in the set of contour points, in the contour points by using the fitted model, and adding the matching contour points, which match with the fitted model, to the set of contour points; repeating the step until a preset condition is met, to obtain a final set of contour points; and performing parameter fitting on the final set of contour points, to obtain a final fitted model, and using the final fitted model as the third recognition result.

Initial interior points are extracted through random sampling, fitted and then gradually expanded, and the model is optimized and then subjected to multi-step iteration, such that a better fitted model is obtained, which reduces the sensitivity to noise, and makes weld bead region positioning more accurate, thus improving the accuracy of a fitting result.

In some embodiments, the first contour line is a circle or an ellipse, the second contour line includes a circular arc or an elliptic arc, and the parameter fitting is ellipse fitting.

A stretched or distorted weld bead region can be well fitted from ellipse fitting. A single fitting method can be used for simultaneously satisfying the fitting requirements of 2D images or 3D images.

According to a second aspect of the embodiments of the present application, an image recognition apparatus is provided, including: an image acquisition module configured to acquire a target image, where the target image includes a weld bead region; a first obtaining module configured to perform initial segmentation on the target image, to obtain a first recognition result, where the first recognition result includes first recognition information for the weld bead region in the target image; a second obtaining module configured to perform feature extraction on the target image, to obtain a region representation; a third obtaining module configured to obtain a context representation based on the first recognition result and the region representation, where the context representation is used for representing a correlation between each pixel and remaining pixels in the target image; and a fourth obtaining module configured to obtain a second recognition result based on the context representation, where the second recognition result includes second recognition information for the weld bead region in the target image.

According to a third aspect of the embodiments of the present application, an image recognition apparatus is provided, including: a processor, a memory, a communications interface, and a communications bus, where the processor, the memory, and the communications interface communicate with each other through the communications bus; and the memory is configured to store at least one executable instruction which causes the processor to carry out the operations of the image recognition method as described above.

According to a fourth aspect of the embodiments of the present application, there is provided a computer-readable storage medium having stored therein at least one executable instruction that, when run on an image recognition apparatus, causes the image recognition apparatus to carry out the operations of the image recognition method as described above.

The aforementioned description is only an overview of the technical solutions of the present application. In order to more clearly understand the technical means of the present application to implement same according to the contents of the specification, and in order to make the aforementioned and other objects, features and advantages of the present application more obvious and understandable, specific embodiments of the present application are exemplarily described below.

BRIEF DESCRIPTION OF THE DRAWINGS

Features, advantages, and technical effects of exemplary embodiments of the present application will be described below with reference to accompanying drawings.

DETAILED DESCRIPTION OF EMBODIMENTS

Figure 1:
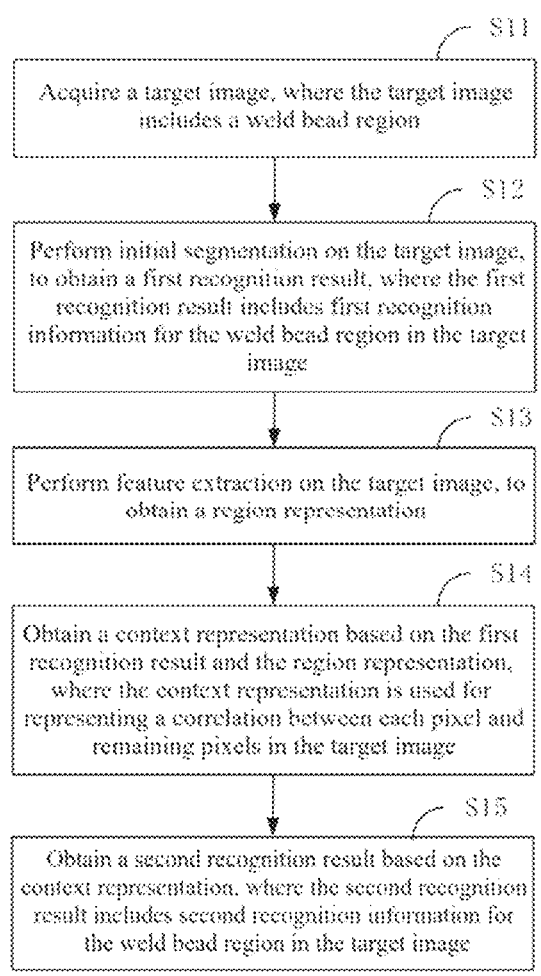
FIG. 1 is a schematic flowchart of an image recognition method according to some embodiments of the present application.

In order to make the objects, technical solutions and advantages of embodiments of the present application clearer, the technical solutions in the embodiments of the present application will be described clearly and completely below with reference to the accompanying drawings in the embodiments of the present application. Obviously, the embodiments described are some of, rather than all of, the embodiments of the present application. All the other embodiments obtained by those of ordinary skill in the art based on the embodiments of the present application without any creative effort shall fall within the scope of protection of the present application.

All the technical and scientific terms used in the present application have the same meaning as those commonly understood by those skilled in the pertinent technical field of the present application, unless otherwise defined; the terms used in the specification of the present application are merely for the purpose of description of the particular embodiments, but are not intended to limit the present application; and the terms "comprising", "having" and any variations thereof in the specification and the claims of the present application as well as the brief description of the drawings described above are intended to cover non-exclusive inclusion. The terms "first", "second", etc. in the description and the claims of the present application as well as the foregoing accompanying drawings are used to distinguish between different objects, rather than describing a specific order or a primary-secondary relationship. In the description of the present application, the term "a plurality of" means two or more, unless otherwise specified.

The phrase "embodiments" referred to in the present application means that the descriptions of specific features, structures, and characteristics in combination with the embodiments are included in at least one embodiment of the present application. The phrase at various locations in the description does not necessarily refer to the same embodiment, or an independent or alternative embodiment exclusive of another embodiment. Those skilled in the art should understand, in explicit and implicit manners, that an embodiment described in the present application may be combined with another embodiment.

As described above, it should be emphasized that when the term "comprising/including" is used in this specification, it is used to clearly indicate the presence of the features, integers, steps or components, but it does not exclude the presence or addition of one or more other features, integers, steps and components or groups of features, integers, steps, and components. As used in the present application, the singular forms "a", "an" and "the" also include the plural forms, unless otherwise clearly stated in the context.

The words "a" and "an" in this specification may mean one, but may also have the same meaning as "at least one" or "one or more". The term "about" generally means the value mentioned plus or minus 10%, or more specifically, plus or minus 5%. The term "or" used in the claims means "and/or", unless it is clearly indicated that it refers to alternatives only.

During manufacturing of batteries, after filling of electrolyte into a battery, it is necessary to seal a filling port to prevent the electrolyte from overflowing. Generally, a sealing pin is used for sealing. After being inserted into the filling port, the sealing pin is welded on the battery. Therefore, the welding of the sealing pin is an indispensable link during the production of the battery, and whether the welding of the sealing pin meets the standard directly affects the safety performance of the battery.

The welding region of the sealing pin is referred to as a weld bead, specifically a weld joint formed by each deposition or melt during welding. Due to variations in temperature and other environmental factors during welding, there are often defects, such as pinholes, burst points, burst lines (also referred to as false welding), lack of welding, and melt beads, on the weld bead. On the basis of visual artificial intelligent (AI), the presence of defects on the weld bead can be automatically detected. During defect detection, weld bead positioning is required first, the accuracy of which will affect the accuracy of defect detection.

In the current weld bead positioning solution, a search range is first determined according to prior information about a weld bead position in an initial weld bead image, and edge detection is then performed twice to obtain two initial edges. Then, a final weld bead contour region is obtained by using a region growing algorithm.

However, the weld bead search range determined according to the prior information is easily affected by a change in processes and product models, and thus may not cover the entire weld bead region, or an estimated position of the weld bead region is incorrect, resulting in incomplete or offset final weld bead positioning. In addition, the edge detection algorithm is easily affected by noise (for example, the presence of melt beads, protrusions, etc. on the weld bead), resulting in inaccurate edge extraction. Moreover, the mode of performing edge detection twice lacks post-processing measures, which further amplifies the positioning error, resulting in an unstable weld bead extraction effect.

On the basis of the findings of the above-mentioned problems, the inventor of the present application has improved the weld bead positioning method, so as to improve the accuracy of weld bead positioning and enhance the safety performance of the battery. Various embodiments of the present application will be further described below with reference to the accompanying drawings.

The embodiments of the present application provide an image recognition method and apparatus, and a computer-readable storage medium. It is to be understood that the image recognition method and apparatus, and the computer-readable storage medium described in the embodiments of the present application are applicable to the recognition of a weld bead, where the weld bead may be a sealing pin weld bead of a battery or a weld bead in other regions of the battery, or may be a weld bead in other products. For ease of description, the recognition of the sealing pin weld bead of the battery is taken as an example for explanation in the following embodiments.

FIG. 1 is a schematic flowchart of an image recognition method according to some embodiments of the present application. The method can be performed on an image recognition apparatus, and the image recognition apparatus can be a computer, a server, or other electronic devices that can run, according to a program, to automatically process massive data at a high speed. Image recognition software can be installed on the image recognition apparatus, so as to perform the image recognition method according to the embodiments of the present application. The method includes the following steps:

S11: acquiring a target image, where the target image includes a weld bead region;

S12: performing initial segmentation on the target image, to obtain a first recognition result, where the first recognition result includes first recognition information for the weld bead region in the target image;

S13: performing feature extraction on the target image, to obtain a region representation;

S14: obtaining a context representation based on the first recognition result and the region representation, where the context representation is used for representing a correlation between each pixel and remaining pixels in the target image; and S15: obtaining a second recognition result based on the context representation, where the second recognition result includes second recognition information for the weld bead region in the target image.

Figure 2:
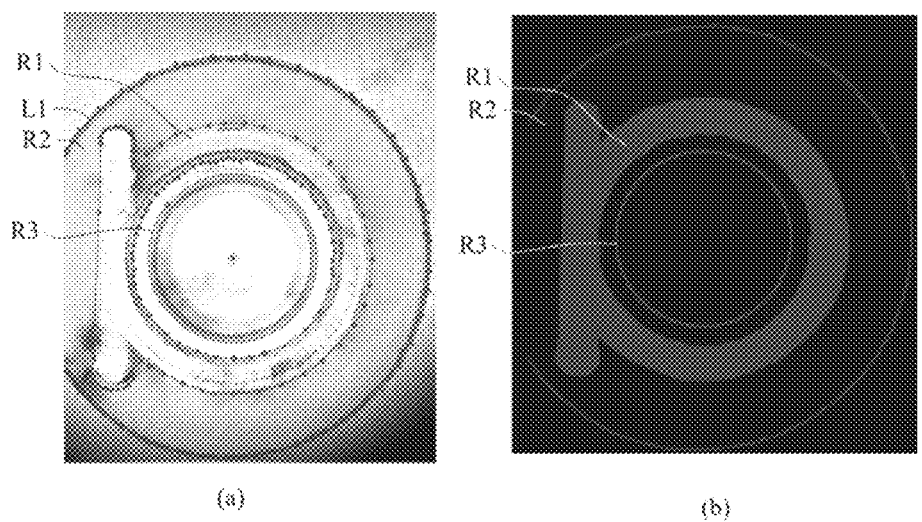
FIG. 2 is a schematic diagram of a sample image and a recognition result labeled in some embodiments of the present application.

Embodiments of the present application are intended to recognize a weld bead in a welding region of the sealing pin of the battery. Based on the recognized weld bead, defects, such as pinholes, burst points, burst lines (also referred to as false welding), lack of welding, and melt beads, can be further detected. Therefore, it is required to first acquire an image of the welding region of the sealing pin of the battery under test, and then perform weld bead recognition based on the image. In step S11, the target image is an image that includes the weld bead region under test. For example, (a) of FIG. 2 is the target image, where a region R1 is the weld bead region.

The target image can be acquired by an image acquisition device on the image recognition apparatus, or can be acquired by an image acquisition device external to the image recognition apparatus, and then sent to the image recognition apparatus. The image acquisition device can be a camera, a laser radar, and other devices with an image acquisition function. Those skilled in the art should understand that, in the embodiments of the present application, the image acquired by the image acquisition device can be processed, such as by cropping out portions, other than the weld bead region, of the image, to improve the efficiency of image recognition.

In step S12, initial segmentation means first recognition of the weld bead region in the target image, and the first recognition result includes the information of the weld bead region that is obtained through first recognition. A segmentation mode may be an existing image recognition mode, for example, various neural network algorithms, including, but not limited to, a fully connected neural network, a convolutional neural network, etc. It is to be understood that the first recognition information for the weld bead region that is included in the first recognition result is contour information of the weld bead region.

In step S13, the feature extraction may also be performed by using various existing feature extraction methods, such as a deep learning-based neural network algorithm, a scale-invariant feature transform (SIFT) algorithm, a histogram of oriented gradient (HOG) algorithm, a speeded up robust features (SURF) algorithm, an oriented fast and rotated brief (ORB) algorithm, and a local binary pattern (LBP) algorithm.

In image recognition, there are many representation methods when an image is segmented into a plurality of regions. Region representation methods include an array representation method, a hierarchical representation method, a feature-based region representation method, etc. Features commonly used in the feature-based region representation method are minimum bounding rectangle, geometric center, moment, Euler number, average greyscale value, variance, etc. In addition, application-related region features can also be used to represent regions. For example, to interpret an image, the representation of the image should also include relationships with neighboring regions. The target image includes both the weld bead region and other regions, such as a cleaning region, and a round raised region in the center of the sealing pin. In the embodiments of the present application, a region representation of each region is obtained based on feature extraction, and a context representation of pixels is obtained in a subsequent step based on the region representation.

In image recognition, the content of a target can be better detected and inferred by recognizing useful global context information and effectively utilizing information of regions surrounding the target. Therefore, in step S14, based on the weld bead region information and the region representation obtained through initial segmentation, the context representation for representing the correlation between each pixel and remaining pixels in the target image is obtained for second recognition, to obtain the second recognition result. As shown in (b) of FIG. 2, the second recognition result includes an outer circle region R2 of the cleaning region, a weld bead region R1, and a round raised region R3 in the center of the sealing pin.

In the image recognition method according to the embodiments of the present application, by means of coarse-to-fine segmentation, first of all, the target image is subjected to first recognition, and the features in the target image are enhanced by using a result of the first recognition, to obtain the context representation for representing the correlation between each pixel and remaining pixels in the target image; and then, the context representation is subjected to second recognition. As such, a more accurate recognition result can be obtained due to contextual information being fully used. The method of the embodiments of the present application can improve the safety of the battery when applied to the recognition of the sealing pin weld bead of the battery.

Further, the image recognition method according to the embodiments of the present application does not rely on the prior information about the position of the weld bead, thereby improving the independence and efficiency of recognition.

The specific processes of image feature extraction, representation and recognition according to some embodiments of the present application are further described below. Specifically, a convolutional neural network is taken as an example for description.

Figure 3:
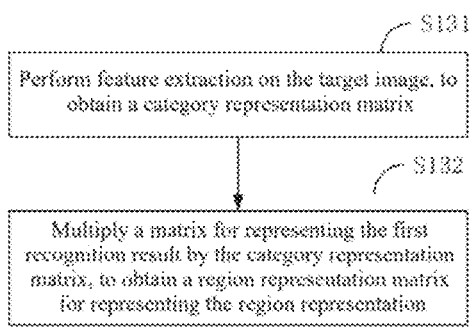
FIG. 3 is a schematic flowchart of step S13 in some embodiments of the present application.

Referring to FIG. 3, FIG. 3 is a schematic flowchart of step S13 in some embodiments of the present application. As shown in the figure, the performing feature extraction on the target image, to obtain a region representation includes:

S131: performing feature extraction on the target image, to obtain a category representation matrix; and S132: multiplying a matrix for representing the first recognition result by the category representation matrix, to obtain a region representation matrix for representing the region representation.

Different regions in the target image, such as the weld bead region, the cleaning region, and the round raised region in the center of the sealing pin, are represented as different features during image recognition. During the recognition of the weld bead region, the category representations of various features, which may also be referred to as classifications, can be obtained through feature extraction.

In a convolutional neural network, when an image is input into the convolutional neural network, the data structure of the image itself, such as a M×N two-dimensional matrix (a black-and-white image) or a L×M×N three-dimensional matrix (a color image), will be maintained, and on this basis, feature extraction and classification are performed. Therefore, all data obtained after various processing of the image in the embodiments of the present application are in the form of a matrix. For example, the category representation of various features obtained through feature extraction is also in the form of a matrix, referred to as a category representation matrix. The first recognition result obtained after initial segmentation of the target image is also represented by a matrix.

The region representation can be obtained based on the first recognition result, which is obtained through initial segmentation, and the category representation. In step S132, the matrix for representing the first recognition result and the category representation matrix are multiplied (i.e., subjected to weighted summation), to obtain the region representation matrix for representing the region representation.

Since a category representation includes feature information of different regions, and the first recognition result also includes feature information of different regions, the accuracy of a finally obtained region representation is improved by comprehensively utilizing the region feature information included in the category representation and the first recognition result.

Figure 4:
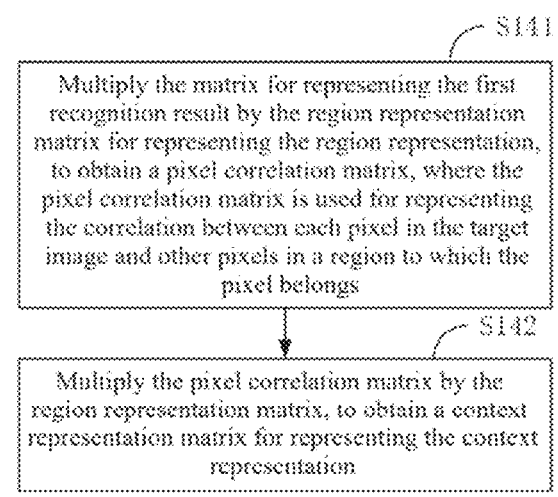
FIG. 4 is a schematic flowchart of step S14 in some embodiments of the present application.

Referring to FIG. 4, FIG. 4 is a schematic flowchart of step S14 in some embodiments of the present application. As shown in the figure, the obtaining a context representation based on the first recognition result and the region representation includes:

S141: multiplying the matrix for representing the first recognition result by the region representation matrix for representing the region representation, to obtain a pixel correlation matrix, where the pixel correlation matrix is used for representing a correlation between each pixel in the target image and other pixels in a region to which the pixel belongs; and S142: multiplying the pixel correlation matrix by the region representation matrix, to obtain a context representation matrix for representing the context representation.

An image is composed of pixels, and the individual pixels in the image do not exist independently of each other, but are intrinsically associated with each other. Such an association is referred to as pixel correlation. In contrast, noise in an image is often in the form of isolated pixels or pixel blocks that cause a relatively strong visual effect. Generally, a noise signal is irrelevant to an effective pixel signal, and it appears as useless information. Thus, in consideration of the correlation between pixels, one pixel can provide reference information about other pixels for image processing, thereby enabling effective image processing.

The first recognition result includes feature information of each pixel, and the region representation includes feature information of different regions. The matrix for representing the first recognition result and the region representation matrix for representing the region representation are multiplied to obtain the pixel correlation matrix for representing the correlation between each pixel in the target image and other pixels in the region to which the pixel belongs. Further, the pixel correlation matrix and the region representation matrix are multiplied to obtain the context representation matrix for representing the context representation.

The context representation matrix obtained based on the pixel correlation matrix and the region representation matrix integrates the correlation between each pixel in the target image and other pixels in the region to which the pixel belongs, and presents an automatic context-aware capability. The second recognition of the weld bead region based on the context representation matrix allows the accuracy of recognition to be further improved.

In some embodiments, the obtaining a second recognition result based on the context representation includes:

S151: performing a convolution operation on the context representation matrix for representing the context representation, to obtain the second recognition result.

The convolution operation for the context representation matrix enables second recognition of the weld bead, to obtain the second recognition result. The convolution operation is used to maintain the data structure of the original image, such as a M×N two-dimensional matrix or a L×M×N three-dimensional matrix, instead of unfolding the image into a vector and thus resulting in loss of spatial information. Neurons in a convolutional layer are connected to only a small region in the previous layer through a convolution kernel, rather than being fully connected thereto, which can reduce training parameters, thus improving efficiency.

Those skilled in the art should understand that, the above steps S12 to S15 can be implemented by a trained image recognition model. A sample image is used to train a deep learning-based neural network model, to obtain a trained image recognition model. The target image under test is input into the trained image recognition model, and the model then outputs the second recognition result, which can be used as an initial segmentation result for weld bead recognition.

It is required to perform data labeling on the sample image, that is, manually labeling the weld bead region on the sample image acquired by the image acquisition device, and weights of the neural network model are optimized based on the manually labeled weld bead region, to complete the training of the model. The weld bead region is labeled generally using a discrete point labeling method in which a complete region needs to be labeled.

In the embodiments of the present application, when labeling the weld bead region on the sample image, it is possible to label only the weld bead region, the cleaning region, and the sealing pin region with discrete points at a certain interval, which improves the efficiency of labeling compared to labeling all outer edges of the region. In addition, regions other than the weld bead region may not be completely retained in the target image, such as a region indicated by a contour L1 shown in (a) of FIG. 2. Labeling this region with only a single contour line will result in a broken contour line. For this type of contour, if the contour itself has a certain width, it is possible to label the width edge of the entire contour to form a non-broken contour line, to solve the problem of contour breaking.

Figure 5:
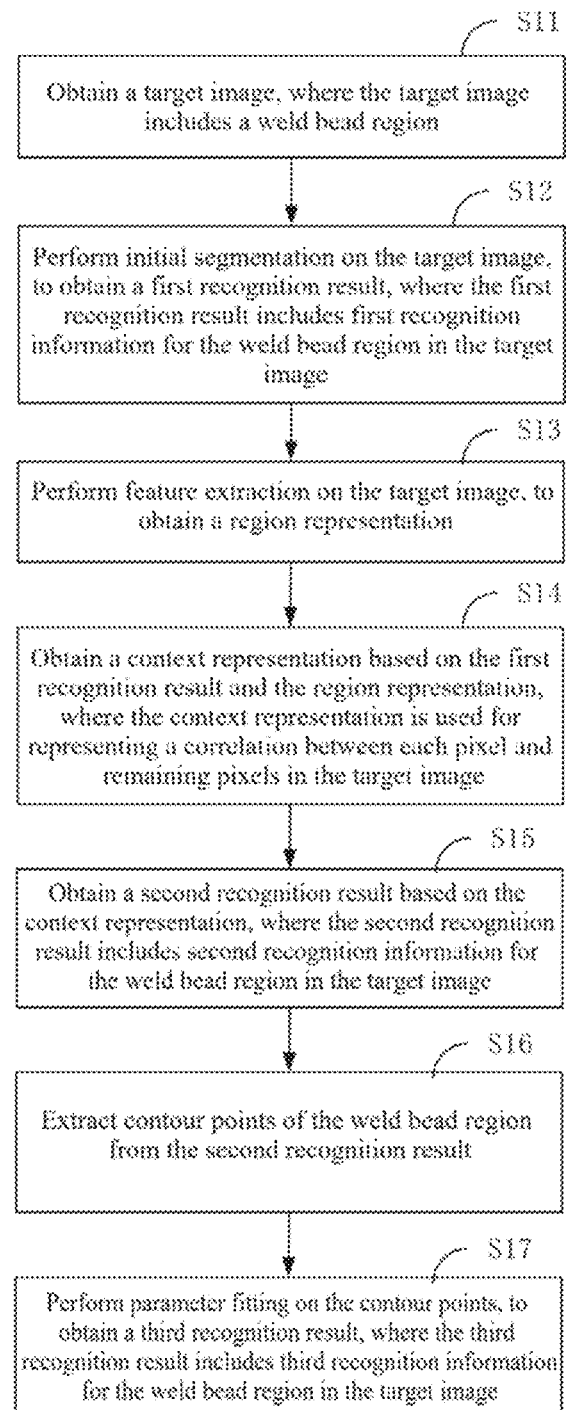
FIG. 5 is a schematic flowchart of an image recognition method according to some embodiments of the present application.

Referring to FIG. 5, FIG. 5 is a schematic flowchart of an image recognition method according to some embodiments of the present application. As shown in the figure, on the basis of the embodiment shown in FIG. 1, the method further includes:

S16: extracting contour points of the weld bead region from the second recognition result; and S17: performing parameter fitting on the contour points, to obtain a third recognition result, where the third recognition result includes third recognition information for the weld bead region in the target image.

In the embodiment shown in FIG. 1, the second recognition result obtained includes the outer circle of the cleaning region, the weld bead, and the round raised portion in the center of the sealing pin. In order to further improve the accuracy of recognition results, morphological post-processing can be used to obtain more regular weld bead parameters. For example, in (b) of FIG. 2, the weld bead is annular, and the weld bead parameters are inner and outer circle parameters of the weld bead. Those skilled in the art should understand that, the embodiment shown in the figure is merely exemplary, and in other embodiments, the weld bead may also be arc-shaped, strip-shaped or have other shapes, and the corresponding weld bead parameters are then parameters corresponding to the weld bead shape.

First of all, a search for contour points of the weld bead region is performed in the second recognition result, to extract the contour points of the weld bead region. For example, in (b) of FIG. 2, a search for the contour points of the inner and outer circles of the weld bead is performed. Then, parameter fitting is performed on the found contour points, to obtain the third recognition result for the weld bead region.

The parameter fitting of the extracted contour points enables the smoothing of the weld bead contour, and the third recognition result is thus obtained, such that the smoothness of the weld bead region during recognition is improved.

Since the weld bead region is generally a region of a certain width, the weld bead region generally includes at least a first contour line and a second contour line, where the first contour line and the second contour line enclose to form the weld bead region. In (b) of FIG. 2, the first contour line is the circle (outer circle) of the region R2, and the second contour line is the circle (inner circle) of the region R3.

Figure 6:
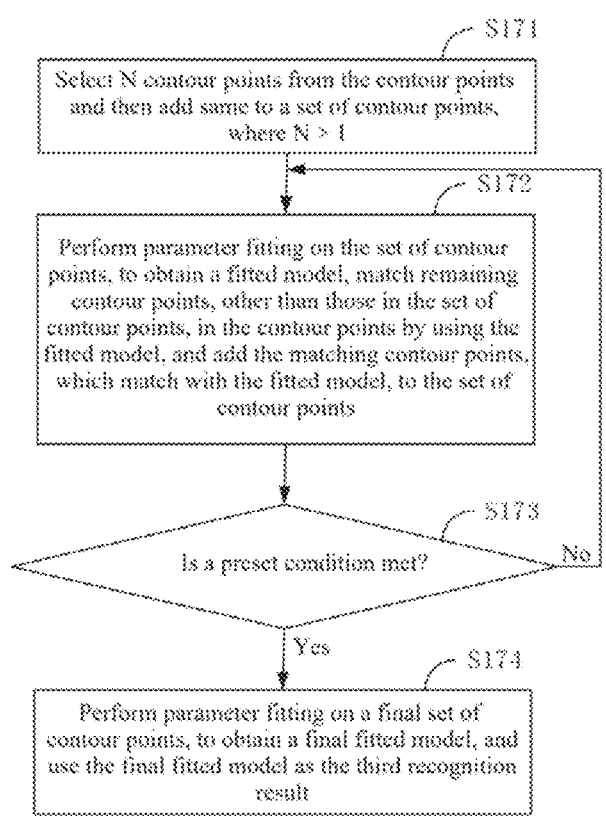
FIG. 6 is a schematic flowchart of step S17 in some embodiments of the present application.

Referring to FIG. 6, FIG. 6 is a schematic flowchart of step S17 in some embodiments of the present application. As shown in the figure, when the weld bead region usually includes the first contour line and the second contour line, the performing parameter fitting on the contour points, to obtain a third recognition result includes:

S171: selecting N contour points from the contour points and adding same to a set of contour points, where N>1;

S172: performing parameter fitting on the set of contour points, to obtain a fitted model, matching remaining contour points, other than those in the set of contour points, in the contour points by using the fitted model, and adding the matching contour points, which match with the fitted model, to the set of contour points;

S173: determining whether a preset condition is met, and if yes, performing step S174, otherwise performing step S172, where the preset condition can be that a predetermined number of iterations is reached, or that a number of contour points in the set of contour points reaches a set threshold; and with step S173, step S172 can be repeated until the preset condition is met, to obtain a final set of contour points; and S174: performing parameter fitting on the final set of contour points, to obtain a final fitted model, and using the final fitted model as the third recognition result.

Generally, the first contour line and the second contour line formed by the contour points extracted in step S106 are irregular, and the weld bead region enclosed by the first contour line and the second contour line is also irregular. Therefore, contour points (i.e., noise points) at irregular positions can be further recognized, and then removed, so that the retained contour points can form a relatively smooth contour line.

The embodiments of the present application involve a parameter fitting method, in which a small portion of data is first randomly selected, from the entire set of contour points, as interior points, and then parameter fitting is performed on the selected interior points to obtain the fitted model. The fitted model is used to predict remaining points (also referred to as exterior points), other than the interior points, in the set of contour points. If the remaining points also apply to the fitted model, the remaining points are considered to be also the interior points, which in turn expand a set of interior points. If enough points are classified as interior points, the currently estimated fitted model is considered reasonable, and then the current set of interior points is used to fit a new fitted model, which is then continuously optimized, so that more interior points are obtained. When a predetermined number of iterations is reached, or after a number of interior points increases to a set threshold, the iteration of the fitted model is stopped. Final exterior points are considered as noise points. The noise points are removed. Using a fitting algorithm, parameter fitting is performed on the set of interior points obtained after removal of the final exterior points, and the obtained fitting result is used as a final recognition result.

Initial interior points are extracted through random sampling, fitted and then gradually expanded, and the model is optimized and then subjected to multi-step iteration, such that a better fitted model is obtained, which reduces the sensitivity to noise, and makes weld bead region positioning more accurate, thus improving the accuracy of a fitting result.

In some embodiments, the first contour line is a circle or an ellipse, the second contour line includes a circular arc or an elliptic arc, and the parameter fitting is ellipse fitting. A standard equation for the inner and outer circles (or ellipses) of the weld bead can be obtained through the ellipse fitting.

In practical application scenarios, when the image acquisition device is a camera, a circular or elliptical weld bead region of a 3D target image containing three-dimensional information is deformed, such as being stretched and distorted, due to the camera imaging. If circle fitting is used, the weld bead contour cannot be 100% fitted, that is, a circle cannot describe the entire weld bead region well. A stretched or distorted weld bead region can be well fitted from ellipse fitting. A single fitting method can be used for simultaneously satisfying the fitting requirements of 2D images or 3D images.

Figure 7:
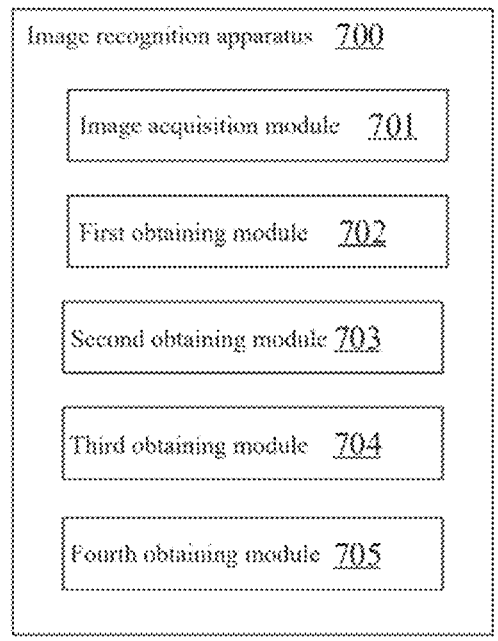
FIG. 7 is a schematic structural diagram of an image recognition apparatus according to some embodiments of the present application.

The image recognition method according to the embodiments of the present application is described above with reference to FIGS. 1 to 6, and the image recognition apparatus according to the embodiments of the present application will be described below with reference to FIG. 7. For the parts not described in detail, reference may be made to the foregoing embodiments. FIG. 7 is a schematic structural diagram of an image recognition apparatus according to some embodiments of the present application. As shown in the figure, the image recognition apparatus 700 includes: an image acquisition module or acquirer 701, a first obtaining module or circuitry 702, a second obtaining module or circuitry 703, a third obtaining module or circuitry 704, and a fourth obtaining module or circuitry 705. Among these modules:

the image acquisition module 701 is configured to acquire a target image, where the target image includes a weld bead region;

the first obtaining module 702 is configured to perform initial segmentation on the target image, to obtain a first recognition result, where the first recognition result includes first recognition information for the weld bead region in the target image;

the second obtaining module 703 is configured to perform feature extraction on the target image, to obtain a region representation;

the third obtaining module 704 is configured to obtain a context representation based on the first recognition result and the region representation, where the context representation is used for representing a correlation between each pixel and remaining pixels in the target image; and the fourth obtaining module 705 is configured to obtain a second recognition result based on the context representation, where the second recognition result includes second recognition information for the weld bead region in the target image.

In the image recognition apparatus according to the embodiments of the present application, by means of coarse-to-fine segmentation, first of all, the target image is subjected to first recognition, and the features in the target image are enhanced by using a result of the first recognition, to obtain the context representation for representing the correlation between each pixel and remaining pixels in the target image; and then, the context representation is subjected to second recognition. As such, a more accurate recognition result can be obtained due to contextual information being fully used. The method of the embodiments of the present application can improve the safety of the battery when applied to the recognition of the sealing pin weld bead of the battery.

In some embodiments, the performing feature extraction on the target image, to obtain a region representation includes:

performing feature extraction on the target image, to obtain a category representation matrix; and multiplying a matrix for representing the first recognition result by the category representation matrix, to obtain a region representation matrix for representing the region representation.

In some embodiments, the obtaining a context representation based on the first recognition result and the region representation includes:

multiplying the matrix for representing the first recognition result by the region representation matrix for representing the region representation, to obtain a pixel correlation matrix, where the pixel correlation matrix is used for representing a correlation between each pixel in the target image and other pixels in a region to which the pixel belongs; and multiplying the pixel correlation matrix by the region representation matrix, to obtain a context representation matrix for representing the context representation.

In some embodiments, the obtaining a second recognition result based on the context representation includes:

performing a convolution operation on the context representation matrix for representing the context representation, to obtain the second recognition result.

In some embodiments, the apparatus further includes an extraction module and a fitting module. Among these modules:

the extraction module is configured to extract contour points of the weld bead region from the second recognition result; and the fitting module is configured to perform parameter fitting on the contour points, to obtain a third recognition result, where the third recognition result includes third recognition information for the weld bead region in the target image.

In some embodiments, the weld bead region includes a first contour line and a second contour line, and the first contour line and the second contour line enclose to form the weld bead region.

The performing parameter fitting on the contour points, to obtain a third recognition result includes:

selecting N contour points from the contour points and adding same to a set of contour points, where N>1;

performing parameter fitting on the set of contour points, to obtain a fitted model, matching remaining contour points, other than those in the set of contour points, in the contour points by using the fitted model, and adding the matching contour points, which match with the fitted model, to the set of contour points; repeating the step until a preset condition is met, to obtain a final set of contour points; and performing parameter fitting on the final set of contour points, to obtain a final fitted model, and using the final fitted model as the third recognition result.

In some embodiments, the first contour line is a circle or an ellipse, the second contour line includes a circular arc or an elliptic arc, and the parameter fitting is ellipse fitting.

Figure 8:
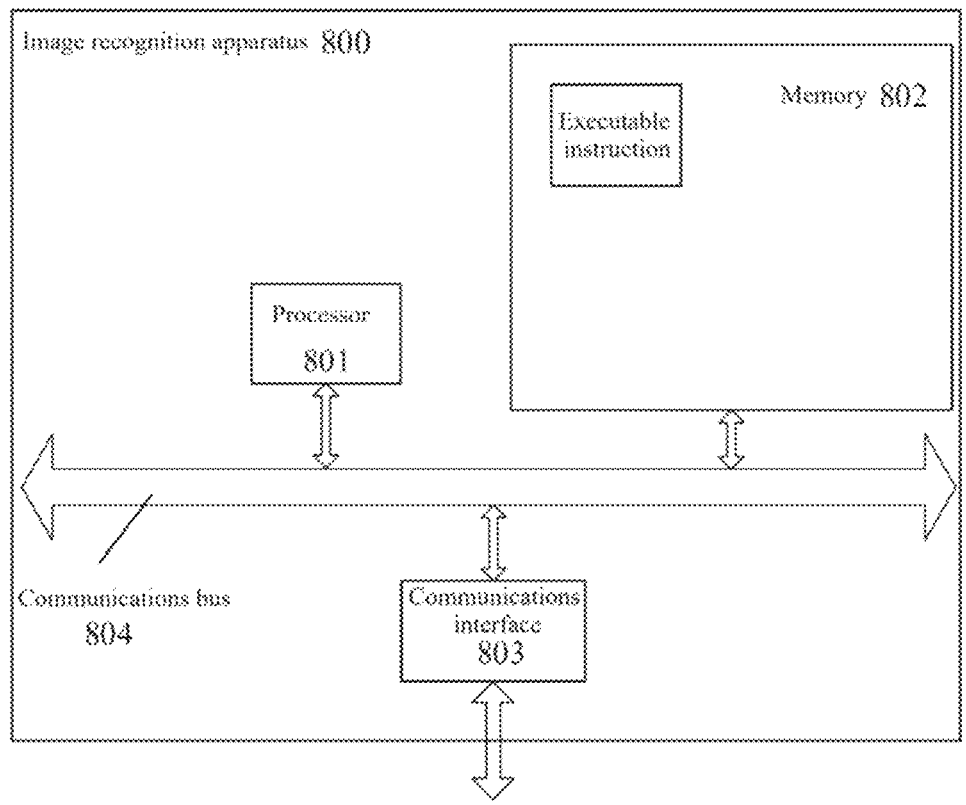
FIG. 8 is a schematic structural diagram of an image recognition apparatus according to some embodiments of the present application.

The image recognition method according to the embodiments of the present application is described above with reference to FIGS. 1 to 6, and the image recognition apparatus according to the embodiments of the present application will be described below with reference to FIG. 8. For the parts not described in detail, reference may be made to the foregoing embodiments. FIG. 8 is a schematic structural diagram of an image recognition apparatus according to some embodiments of the present application. As shown in the figure, the image recognition apparatus 800 includes a processor 801, a memory 802, a communications interface 803, and a communications bus 804. The processor 801, the memory 802, and the communications interface 803 communicate with each other through the communications bus 804.

The memory 802 is configured to store at least one executable instruction which causes the processor 801 to carry out the operations of the image recognition method in the foregoing embodiments.

An embodiment of the present application further provides a computer-readable storage medium having stored therein at least one executable instruction that, when run on an image recognition apparatus, causes the image recognition apparatus to carry out the operations of the image recognition method in the foregoing embodiments.

Finally, it should be noted that the above embodiments are merely used for illustrating rather than limiting the technical solutions of the present application; although the present application has been illustrated in detail with reference to the foregoing embodiments, those of ordinary skill in the art should understand that the technical solutions specified in the foregoing embodiments may still be modified, or some or all the technical features in the technical solutions may be equivalently replaced; and these modifications or replacements do not make the essence of the corresponding technical solutions depart from the scope of the technical solutions of the embodiments of the present application, and all fall within the scope of the claims and the specification of the present application. In particular, the technical features mentioned in the embodiments can be combined in any manner, provided that there is no structural conflict. The present application is not limited to the specific embodiments disclosed herein, but includes all the technical solutions that fall within the scope of the claims.

The invention claimed is:

1. An image recognition method, comprising:
   acquiring a target image, wherein the target image comprises a weld bead region;
   performing initial segmentation on the target image, to obtain a first recognition result, wherein the first recognition result comprises first recognition information for the weld bead region in the target image;
   performing feature extraction on the target image, to obtain a region representation;
   obtaining a context representation based on the first recognition result and the region representation, wherein the context representation represents a correlation between each pixel and remaining pixels in the target image; and
   obtaining a second recognition result based on the context representation, wherein the second recognition result comprises second recognition information for the weld bead region in the target image.

2. The method of claim 1, wherein the performing feature extraction on the target image, to obtain a region representation comprises:
   performing feature extraction on the target image, to obtain a category representation matrix; and
   multiplying a matrix for representing the first recognition result by the category representation matrix, to obtain a region representation matrix for representing the region representation.

3. The method of claim 1, wherein the obtaining a context representation based on the first recognition result and the region representation comprises:
   multiplying the matrix for representing the first recognition result by the region representation matrix for representing the region representation, to obtain a pixel correlation matrix, wherein the pixel correlation matrix is used for representing a correlation between each pixel in the target image and other pixels in a region to which the pixel belongs; and multiplying the pixel correlation matrix by the region representation matrix, to obtain a context representation matrix for representing the context representation.

4. The method of claim 1, wherein the obtaining a second recognition result based on the context representation comprises:

performing a convolution operation on the context representation matrix for representing the context representation, to obtain the second recognition result.

5. The method of claim 1, further comprising:

extracting contour points of the weld bead region from the second recognition result; and performing parameter fitting on the contour points, to obtain a third recognition result, wherein the third recognition result comprises third recognition information for the weld bead region in the target image.

6. The method of claim 5, wherein the weld bead region comprises a first contour line and a second contour line, and the first contour line and the second contour line enclose to form the weld bead region; and the performing parameter fitting on the contour points, to obtain a third recognition result comprises:

selecting N contour points from the contour points and adding same to a set of contour points, wherein N>1;

performing parameter fitting on the set of contour points, to obtain a fitted model, matching remaining contour points, other than those in the set of contour points, in the contour points by using the fitted model, and adding the matching contour points, which match with the fitted model, to the set of contour points; repeating the step until a preset condition is met, to obtain a final set of contour points; and performing parameter fitting on the final set of contour points, to obtain a final fitted model, and using the final fitted model as the third recognition result.

7. The method of claim 6, wherein the first contour line is a circle or an ellipse, the second contour line comprises a circular arc or an elliptic arc, and the parameter fitting is ellipse fitting.

8. An image recognition apparatus, comprising: a processor, a memory, a communications interface, and a communications bus, wherein the processor, the memory, and the communications interface communicate with each other through the communications bus; and the memory is configured to store at least one executable instruction which causes the processor to carry out the operations of the image recognition method of claim 1.

9. A non-transitory computer-readable storage medium having stored therein at least one executable instruction that, when run on an image recognition apparatus, causes the image recognition apparatus to carry out the operations of the image recognition method of claim 1.

10. An image recognition apparatus, comprising:

circuitry configured to carry out the operations of the image recognition method of claim 1.

11. An image recognition apparatus, comprising:

an image acquirer to acquire a target image, wherein the target image comprises a weld bead region;

a first obtaining circuitry to perform initial segmentation on the target image, to obtain a first recognition result, wherein the first recognition result comprises first recognition information for the weld bead region in the target image;

a second obtaining circuitry to perform feature extraction on the target image, to obtain a region representation;

a third obtaining circuitry to obtain a context representation based on the first recognition result and the region representation, wherein the context representation represents a correlation between each pixel and remaining pixels in the target image; and a fourth obtaining circuitry to obtain a second recognition result based on the context representation, wherein the second recognition result comprises second recognition information for the weld bead region in the target image.

* * * * *